Sept. 29, 1970  MINORU FUJII  3,531,352
METHOD OF MANUFACTURING GLUED WOOD BOARDS AND PANELS FROM
NARROWER PIECES USING TEMPORARY TENSIONED WIRES
Filed Oct. 5, 1966  5 Sheets-Sheet 1

INVENTOR
MINORU FUJII
BY
Roy Mattern Jr.
ATTORNEY

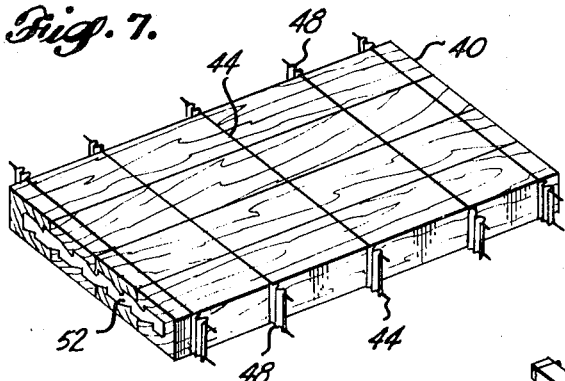
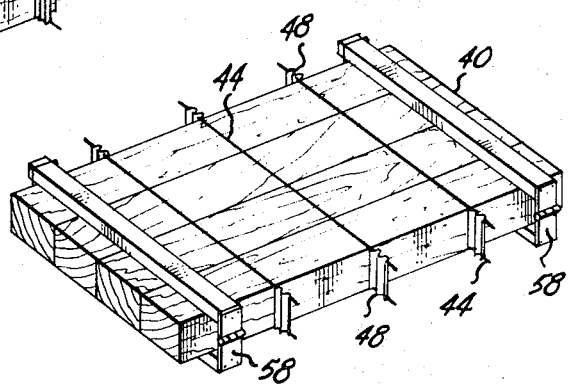
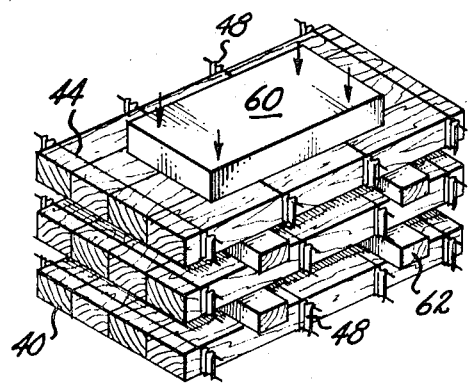
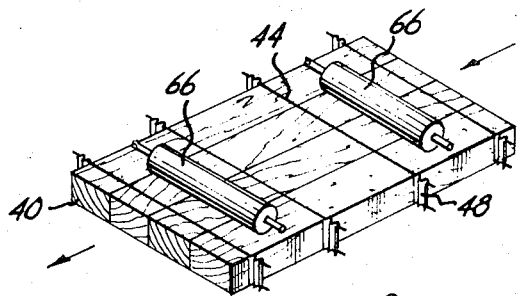
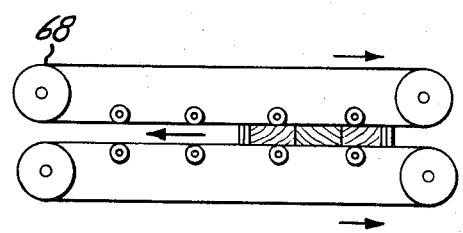

INVENTOR.
MINORU FUJII
BY
Roy E Mattern Jr
ATTORNEY

United States Patent Office 3,531,352
Patented Sept. 29, 1970

3,531,352
METHOD OF MANUFACTURING GLUED WOOD BOARDS AND PANELS FROM NARROWER PIECES USING TEMPORARY TENSIONED WIRES
Minoru Fujii, 5601 52nd Ave. S., Seattle, Wash. 98118
Filed Oct. 5, 1966, Ser. No. 584,464
Int. Cl. B27m 3/00
U.S. Cl. 156—304          11 Claims This invention relates to the resulting product, its methods of manufacture, accessories used during manufacture and apparatus operated during manufacture of wood boards and panels from narrower wood pieces that are glued together during the manufacture.

The purpose of the invention is to provide wood boards and panels of high quality glue bonds derived from multiple narrower wood pieces by using accessories, apparatus, and methods that result in providing such quality glue bonds boards and panels at lower cost, with savings being realized throughout, from the preparation of narrower wood pieces through final assembly of such wood boards and panels.

This invention, now preliminarily described by way of introduction, in reference to its resulting product, its method of production, its interim production accessories, and production apparatus; comprises, Cutting and selection of narrower wood strips within a substantially broad tolerance of moisture content and size;

Applying adhesives to sides of the selected narrower wood strips that are to be joined to adjacent narrower wood strips;

Crowding the selected glued narrower wood strips into a board or panel widths of a pre-determined size or size range, using apparatus temporarily for such crowding together without buckling;

Applying temporary bonding pressure and vertical aligning pressure on the wood strip assembly being made into board or panel widths;

Using wire and wire handling apparatus to pass and to tension wires about the crowded glued narrower wood strips at space intervals;

Clamping wire ends within sheet metal receivers, retainers, or seals, to maintain wires in tension about the crowded glued narrower wood strips;

Removing the temporary bonding pressure and aligning pressure from the wood assembly;

Removing the wire held glued resulting board or panel from the apparatus temporarily used for the crowding without buckling;

Allowing sufficient curing of the glue in the wire held resulting board under specified environmental conditions;

Removing tensioned wires and sheet metal retainers after the curing cycle;

Trimming and otherwise finishing the board or panel derived from side by side glued together narrower wood strips.

As the following description is read, these principal statements of inventive features will become more apparent. Also other inventive features will be discussed, which by their nature are not universally applicable when the invention is practiced. They are applicable only if certain functional and/or production results are to be obtained. This is especially true where high speed production is the objective.

The invention, therefore, is illustrated and correspondingly described, commencing with figures illustrating what forming motions, holding forces, and basic accessories and apparatus are required. Then in the closing figures, both continuous and job shop production apparatus are illustrated. In the drawings;

FIG. 1 schematically indicates, in three steps, how selected cut narrower wood strips, as viewed through their cross section, are first pressed down against a working surface, by apparatus not shown, while they are also pressed into bonding relationship while held together, are then continuously held together while they are secured, as the outside wood strips are connected to one another by members which are tensioned and secured to these outside wood strips, are finally released from the apparatus and held together only by the tensioned members while the glue cures;

FIG. 2 indicates, schematically and in perspective how tension members, such as bands, straps or wire, as shown, are used as the tensioned members being applied at spaced intervals to insure retention of intimate contact of bond surfaces throughout;

Figure 6:
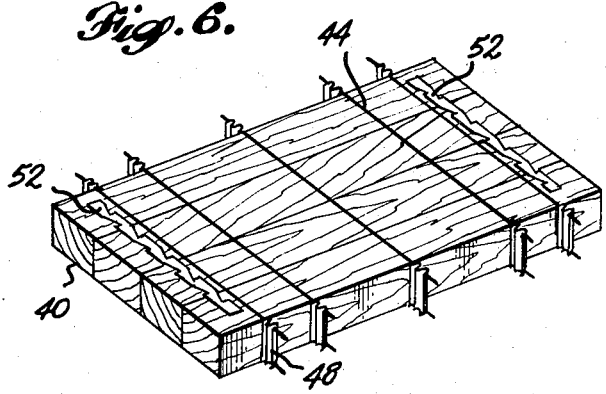
Figure 5:
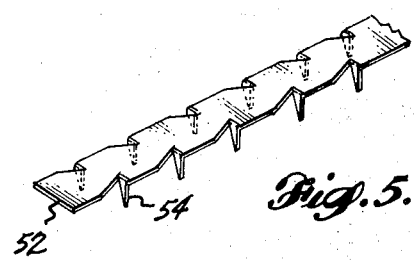
FIG. 5 depicts a preformed multiple pronged anchor.
Figure 12:
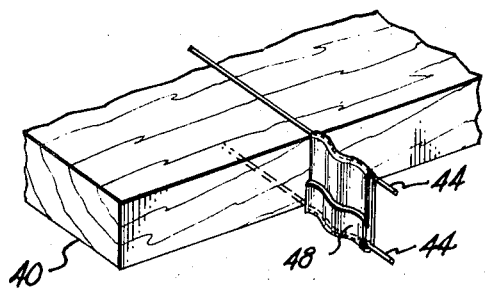
Figure 13:
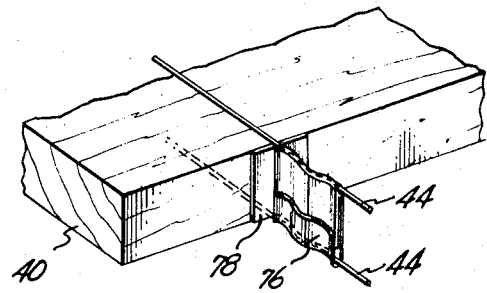
Figure 14:
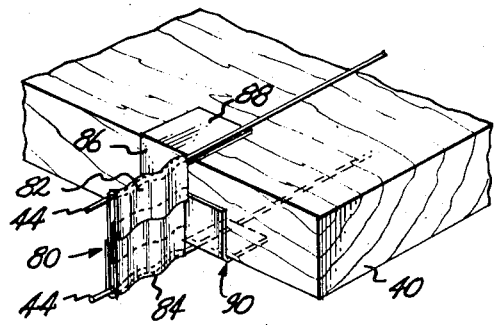
Figure 15:
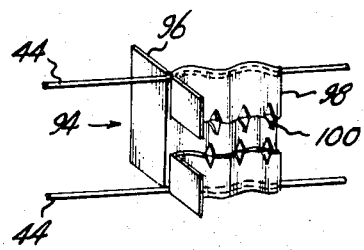
Figure 16:
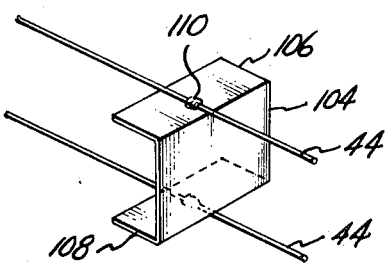
Figure 17:
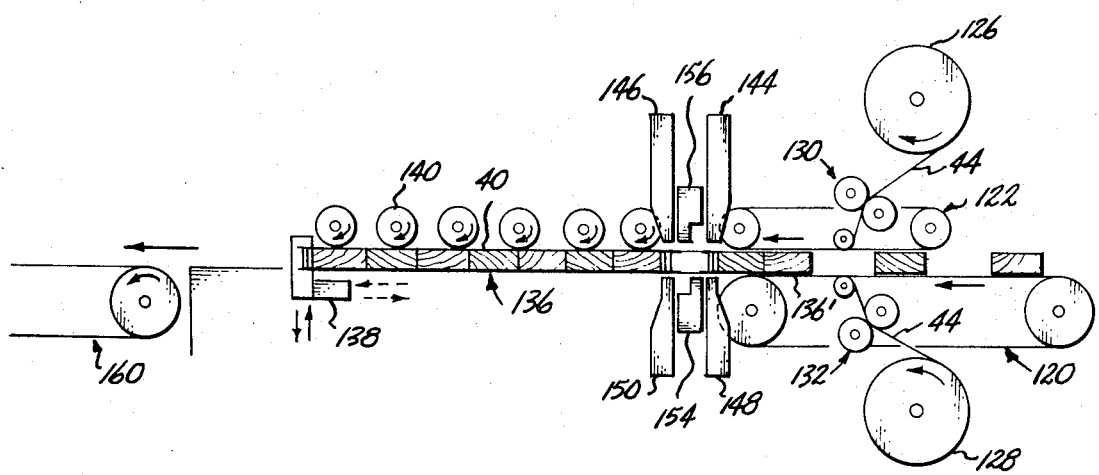
Figure 18:
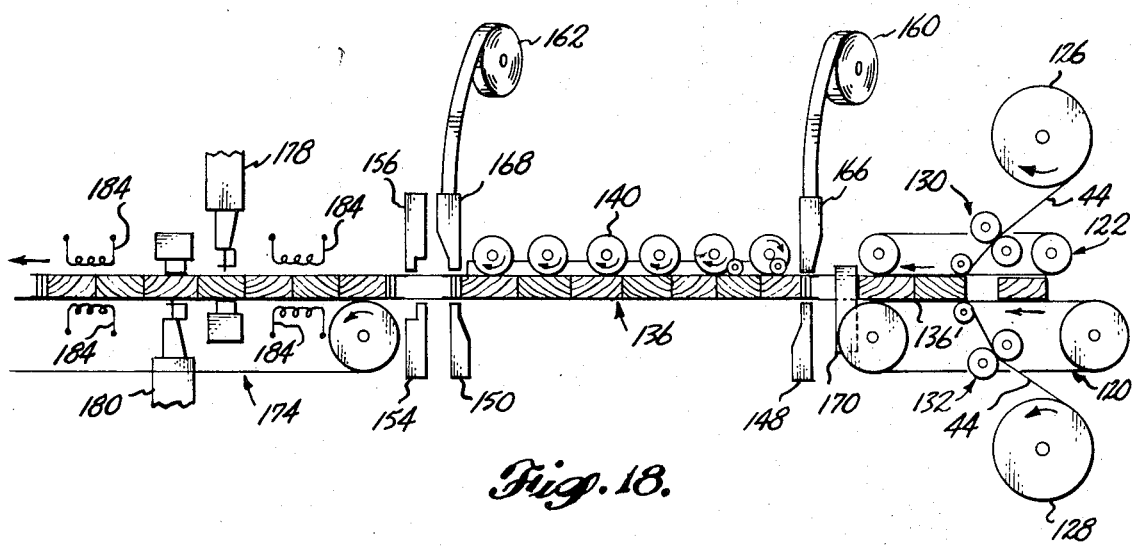
Figure 19:
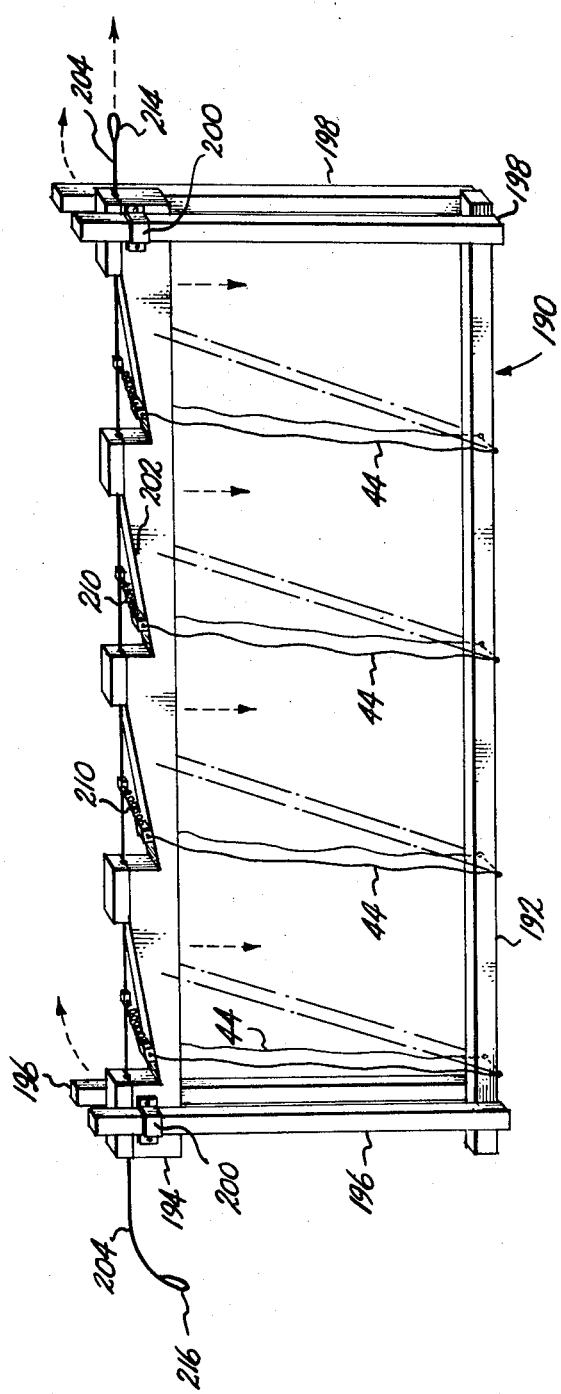

FIG. 6 reveals how this formed multiple pronged anchor of FIG. 5 is used across each board end penetrating into each narrower strip;

FIG. 7 shows how this formed multiple pronged anchor of FIGS. 5 and 6 is used in end grain across ends of the narrow strips which comprise the board under production;

FIG. 8 indicates how, in lieu of stapling or stitching end wires or in lieu of pronged end members shown in FIGS. 4, 5, 6 and 7, special reuseable clamping bars are employed;

FIG. 9 illustrates how several wire held strip boards are stacked and pressed together;

FIG. 10 illustrates, how on continuous production lines, spaced conveyor rollers, are employed in lieu of clamps, stitched wires and/or pronged members, and the wood panel is shown moving in the direction of its grain;

FIG. 11 discloses how belts are employed in lieu of spaced conveyor rollers of FIG. 10, where the creation of nonbuckling forces is combined with the creation of product delivery forces by using conveyor belts; and the wood panel is shown moving in a direction perpendicular to its grain;

FIG. 12 indicates how the tensioned wires are secured at the edge strips in tension with metal receiving and anchoring seals;

FIG. 13 like FIG. 12, illustrates the use of metal seals, retainers or receivers or anchors, however, the added abutment structure of the retainers is shown in its protective wood strip edge abutting relationship to prevent cutting of the wood by the retainers;

FIG. 14 like FIG. 13, depicts a metal receiver or retainer for tension wires, however, the receiver is made of two major segments, joined together, as one portion moves down from above and the other portion moves up from below the wires;

FIG. 15 like FIG. 13, shows a metal receiver or retainer, however, the folded edges which grip the tension wires are spaced apart vertically and pierced along the edges and locked into firm engagement with the other principal vertical portion of the retainer or receiver;

FIG. 16 like FIG. 12, indicates a receiver for the ends of tensioned wires, however, the receiver, retainer or seal, fits outer edges of the resulting board which is under production and, in so doing, the receiver or retainer presents top and bottom flanges which also serve as places for spot-welding the tension wires in place;

FIG. 17, illustrates a preferred embodiment, shown in a schematic cross section of production line apparatus to place and to secure spaced tension wires about glue treated narrower wood strips which are being assembled together to form a panel or board;

FIG. 18, illustrates in schematic cross section another embodiment with added accessories beyond those shown in FIG. 17, to arrange wood strips with adhesive applied (not shown) and then to place and to secure spaced tension wires about the wood strips to form a panel or board; and FIG. 19, illustrates a versatile clamping apparatus used in handling narrower wood strips on a job shop basis for panel or board production.

Throughout these figures from the simple embodiments, using basic motions, forces, apparatus, accessories and wire or wire like members, to the more complex production embodiments, there are shown new methods, new parts, new apparatus, new machines, new fasteners, new tools which all result in new interim products of wire or wire-like held edge glued narrower wood strips formed into boards and panels. Then after the glue is cured, in most instances, the interim product becomes the final product, as the wires are removed and, as necessary, further trimming and sanding is undertaken.

The holding of wood parts together during the glue curing times to make such products as box sections, using bands and wires as the holding members, has been undertaken in the past. However, as will be realized upon reading the following descriptions, utilization of spaced tensioned wire or wire-like members to hold together glue treated narrower wood boards and strips during production of wider boards an panels is practice differently with wire and wire-like holding members, their securing members and related production facilities.

Figure 1:
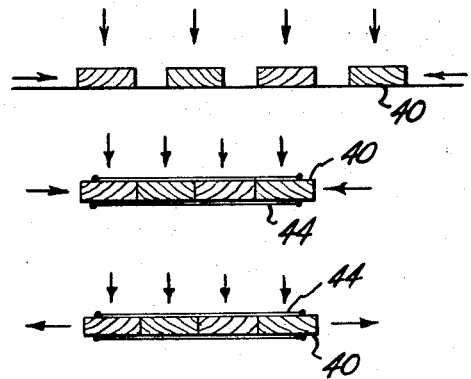

Referring to the drawings, in order of the figures, the invention is described by first discussing the principle or principles that are involved as schematically indicated in FIG. 1. It is well known that when narrow wood strips are crowded and lateral compressive pressure is applied, the strips often will move out of a uniform plane and buckle if the lateral pressure becomes excessive. Yet when glue treated narrower wood strips or boards are to be glued together the lateral pressures formerly considered to be necessary to insure satisfactory edge bonding would always lead to such buckling. Therefore, if the wood strip panel product objective was to be satisfied, pressures at right angle to these lateral pressures had to be applied and maintained during curing of the adhesive. Depending on the product uses and the glues correspondingly selected, the production of such wanted wood strip boards or panels was undertaken using strong hand operated screw clamping devices or when higher production was needed, extensive clamping and/or holding machines were employed.

Whether hand or production machines were used the forces applied were substantial and they were continuously maintained generally by the original force applying equipment. Therefore, during the cure time such equipment was not available for succeeding production. To keep the equipment working and in regard to some glues, the application of heat by steam supplied hot presses or by high frequency electrical power equipment has been undertaken to shorten the cure time and also to improve the resulting bonds. Machinery, presently in use, has these limitations and disadvantages. However, upon the utilization of this invention, such limitations and disadvantages could be overcome.

With the objective of determining a better way to hold such wood strips in place during curing of their edge glued mating portions, wires and wire-like members are employed. There remains, as indicated at the top of FIG. 1, a need for forces to move and press glue treated strips laterally together on a holding table or the like while being pushed down. Once the wood strips are positioned, wires are extended from the outside wood strips across the other strips and anchored under tension. Then after their securement, the release of lateral force is possible. Oftentimes, release of vertical aligning pressure from above without resulting buckling is also possible.

Such wires are spaced along the board assembly and when said wires are under balanced tension, they tend to resist or counteract bending movement created by buckling forces. When this assembled panel is relatively thick and narrow, the above balancing force is sufficient to prevent buckling. However, when the thickness-to-board width ratio exceeds certain limits, this balancing force is not sufficient to prevent buckling and as previously discussed, preventive measures are required. In such cases, only minimum restraining forces have been found effective.

Contrary to the popular belief that pressures between 100 and 200 p.s.i. are required to produce satisfactory boards in lumber edge gluing, it has been found that under properly controlled conditions, particularly with regard to conditioning of wood and preparation of surfaces to be joined, considerably lower pressure, say, in the range of 1 to 10 p.s.i. are sufficient to maintain intimate contact between adjacent members and thus produce high quality commercially acceptable bonds. Under such conditions, adequate bonding contact can be retained through the use of properly spaced and tensioned wires of relatively small gage and high tensile strength.

Utilization of holding wires 44 or wire-like members in this way offers many advantages by providing holding means at lower cost, often eliminating expensive machinery requirements and certainly reducing the holding time of the products in such higher cost machinery and equipment. Also several boards can be made within one wire holding panel construction by selectively omitting a glue line or two.

Figure 3:
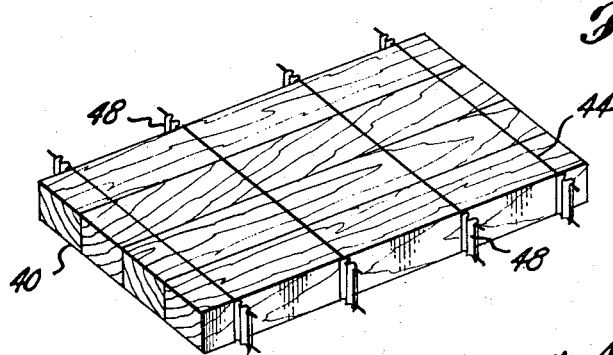
FIG. 3 shows how wires are tensioned and then anchored in crimped metal receivers, known as retainers or seals, along the outer edge of the outer strips.

Lower costs are made possible by using high strength, small diameter wires 44 which can be disposed of after one use. In accordance with this objective and with the broader objective of quickly and conveniently tensioning and securing the holding wires 44, terminal sheet metal clips, such as clip 48, are employed as illustrated in FIG. 3 and in other following figures. These clips receive the wires under tension and then are crimped to secure the wires in place.

Figure 2:
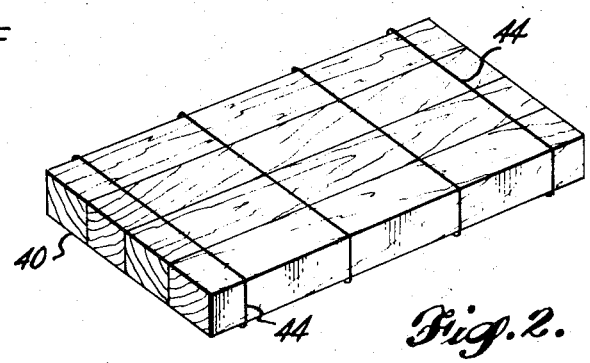

In FIGS. 4, 5, 6 and 7, in addition to holding wires, means are shown to prevent buckling of the board assembly. As discussed previously, after tensioning wires 44 are either completely drawn about wood strips 40 or are anchored top and bottom, at the side wood strips as shown in FIGS. 1 and 2, then lateral compressive pressures can be removed. Often there remain, a requirement for continued pressures from above and below to avoid buckling. Therefore, where wider wood strips in greater quantity are to be bonded together and/or where greater tolerances of precutting and forming of the wood strips are to be permitted, cooperating pressures from above and below or their reactive forces in cooperation with work supports must be relied upon. This is true, unless the inventive concept is used as illustrated first in FIG. 4 and subsequently in FIGS. 5, 6 and 7. In most production operations, where buckling might have a tendency to occur, it may be avoided by stitching and/or stapling 50 the holding wires 44 to the wood strips 40. Generally, such stitching and/or stapling 50 is only required along the near panel end positioned holding wires 44 to acquire the non buckling result wanted during curing of the glue.

As a substitute for stitching or stapling a sheet-metal strip 52 performed with a series of prongs 54 as shown in FIG. 5 may be driven into the wood strips 40 as indicated in FIG. 6 and also as indicated in FIG. 7.

FIGS. 8 through 11, illustrate, schematically, how other means may be employed to keep the wood strips from buckling where volume production would be contemplated and/or impingement of wood surfaces by switches, staples or prongs is not wanted. In FIG. 8, hinged clamps 58 are shown. A weight or holding means 60 is depicted in FIG. 9, where several panels are stacked above one another with separators 62 in between them. Production pressure rollers 66 are illustrated in FIG. 10, and powered pressure belt assemblies 68 are shown in FIG. 11. Throughout all these production methods, the tensioned holding wires 44 and their crimped retainers 48 continue their function with respect to lateral pressures and are aiding the maintenance of the antibuckling pressures. These wire retaining devices perform important functions besides securing the wires under tension. For wood strip assembly whose board width to thickness ratio exceeds certain limit, they are designed to prevent the retainers from slipping around the panel edges which will cause the tensioned wires to lose balance resulting in buckling or collapse of wood strip assembly.

FIGS. 12 through 16 illustrate various embodiments of retainers or receivers 48 shown previously. In FIG. 12, the retainer 48 is enlarged to indicate how it is folded over the top and bottom tensioned wires 44 and crimped while the wires are drawn tight, being preloaded by a pulling means not shown. The interior of this retainer and the interiors of all retainers may be lined with abrasives that assist in maintaining the tension loading on the holding wires 44. The abrasives are applied like plastic directly and/or by using the medium of a paper backing such as a sandpaper product (not shown). Retainer 76 illustrated in FIG. 13 has additional portions flared out to both sides as abutment members 78 to contact the wood strip edge. These abutments distribute holding forces and protect wood strip edges from damaging penetrations, otherwise caused by metal edges and wires. Retainer 80 shown in FIG. 14, is derived from two pieces 82, 84 which are overlapped and crimped together about wires 44. Each piece is equipped with side edge abutment 86 and top edge 88 abutment forming a corner structure 90. These respective corner structures 90 during installation are useful in locating retainer 80 and after installation they serve to protect the wood product from impingement by metal edges and/or wire. Retaainer 94 illustrated in FIG. 15, has abutment portions 96 to contact and to protect the wood strip edges as noted before, however, for better locking of the fold over portions 98, metal piercing and locking modifications 100 are made upon installation. Retainer 104, of a channel shape having top flange 106 and bottom flange 108, is designed to receive wires 44 as they are spot welded 110 to the respective flanges.

These various retainers, receivers, or seals illustrated in FIGS. 12 through 16 made to meet production requirements indicate as do the production antibuckling force applying means of FIGS. 10 and 11, that higher production speeds are possible. Schematically, such higher production methods and apparatus are illustrated in elevation in two different embodiments in FIGS. 17 and 18. In each of these figures, precut and glue treated wood strips 40 are shown as being fed into the apparatus from the right and moved on through and out on the left. They are glue treated, not shown, then placed on a belt conveyor 120. Soon they are controlled from above by moving belt assembly 122. These two cooperating belt assemblies crowd the edge glued wood strips 40 together. While such positioning is being undertaken, upper and lower holding wires 44 are being drawn from respective wire reels 126, 128 and directed through their respective sets of guide rollers 130, 132 into contact with the wood strips 40. These upper and lower wires 44 are moved along with wood strips 40.

At the start of production and thereafter a group of wood strips 40 forming a panel or wider board 136 are moved into contact with adjustable and retractable stop 138 shown only in FIG. 17 by spaced powered overhead antibuckling feed rollers 140. The panel is supported at this time by a smooth work surface of a support, not shown. Feed rollers 140 may provide all the lateral bonding pressure or preferably a separate compression bar not shown may apply this pressure. Between the termination of the crowding and feeding belt assemblies 120, 122 and the commencement of the antibuckling feed rollers 140, an approximate one wood strip space is made. At this open space, preformed retainers 48 or ones of like purpose, are fed from above through feeders 144, 146 and secured into place by crimpers or welders 148, 150 working from below or vise versa. Once wires 44 are firmly secured at the end of leading panel 136 and commencement of the succeeding panel, which is just being crowded into its assembly, then wires 44 are cut by wire cutters 154, 156.

Stop 138 is then retracted and the leading completed panel 136 is powered on to panel removing belt conveyor 160 while at the same time, crowding and forming succeeding panel 136′ is being advanced to stop 138, which is timely repositioned. At the commencement of any production run retainers or receivers 48 must be singly installed to secure wires 44 to a starting, crowding and/or forming panel 136′.

This preceding description is essentially accurate for like features of like apparatus shown in both FIGS. 17 and 18. However, in FIG. 18, additional equipment is illustrated. For example, retainers 48 or seals are made from strip material right at the production line a voiding additional handling of retainers 48 which might otherwise be produced elsewhere. Strip materials from two rolls 160, 162 are fed into stamping and feeding mechanisms 166, 168 and crimped or welded by units 148, 150. A retractable stopper 170 at the crowder conveyors 120, 122, holds back wood strips momentarily while retainers or seals 48 are being crimped or spot welded, and while wire cutters 154, 156 are severing wires 44. Feed rollers 140, may be used to provide the bonding pressure or, preferably separate compression bar, not shown, may be used for applying bonding pressure.

At this point in production, wood strips 40 might be driven on to a removal conveyor as FIG. 17, however, in FIG. 18, the glued panel 136 is received by a further processing conveyor 174. In conjunction with this conveyor 174 operation, two additional process steps are undertaken either singly, alternatively or jointly. As discussed previously, stitching and/or stapling or other means is sometimes needed to avoid buckling of the panel. Generally, only the holding wires 44 nearest the ends of the panels 136 are stitched or stapled to all or some of the wood strips 40, or the sheet metal pronged strip 52 is employed. This is accomplished by using, for example, wire stitchers or staplers 178, 180 as shown in FIG. 18.

For many reasons, but primarily because of different qualities and physical properties of adhesives selected, there are requirements for heating their glue lines to insure that curing will be completed and/or to accelerate the curing process. Therefore along this further processing conveyor 174, electrical heating units 184 are installed both above and below panel 136. After handling on conveyor 174, panels 136 are moved on using removal conveyor 160, not shown in FIG. 18 but shown in FIG. 17.

The two selected schematic illustrations of production apparatus indicate how the employment of wires or wirelike members 44 makes it possible to produce an edge glued board or panel from narrower strips of wood 40 at a high rate, using assembly line production apparatus. In so doing, lower initial capital costs are required and lower operational expenses are incurred, when this invention, as practiced, is compared with other currently practiced production methods involving edge gluing of wood strips and/or narrower wood pieces to be made into wider boards and panels.

Although, FIGS. 1 through 8, suggest that this invention is practiced following many procedures using hand tools, and FIGS. 9 through 11, 17 and 18 indicate the invention is practiced following many machining operations, FIG. 19 represents a compromise between the two extremes of low and high capital investments in tooling. Illustrated in FIG. 19 is an adjustable clamping jig or frame assembly 190. Longitudinal side members 192, 194 are adjustably spaced apart by transverse due side members 196, 198 using sliding adjustment brackets 200. One longitudinal side member 194 is made with several inclined planes 202. Across the top of such planes 202, a pull wire 204 is removably and slidably secured by guide blocks, 206. Several sets of holding wires 44, one set per inclined plane 202, are positioned firmly along longitudinal side member 192 and looped over the respective inclined planes 202. Springs 210 join the holding wire 44, in loop configurations, to pull wire 204.

With the jig or frame assembly 190, so contracted, multiple wood strips, not shown, after being glue treated, are loaded in, on or against longitudinal side member 192. When a preselected board or panel width is matched or exceeded, longitudinal side member 194, through sliding adjustment means 200, is moved into contact with the nearest panel edge, which has not been coated with glue under pressure applied by a means, not shown. Thereafter a pull of transverse pulling wire 204, using gripping loop 214, positions the resulting inclined wires 44 in locking positions and consequently the wood strips are firmly held in place during curing of the glue in the panel. Subsequently, release is easily accomplished by using gripping loop 216 at the other end of pulling wire 204. The retractive forces of springs 210 assist in making the release complete, so that a panel, board or boards, may be easily withdrawn.

These drawings indicate with the preceding discussions, that employment of selectively spaced holding wires arranged to crowd together and to hold together multiple wood strips, results in production of such edge glued boards and panels in quicker, lower cost ways than ever realized before. This is true whether hand operations, semi-line production operations or full line production operations are to be considered and compared. Use of wires, such as those made of #1040 high carbon steel wire .014 or .020 inch in diameter, establishes all the holding forces that are found to be needed.

Figure 4:
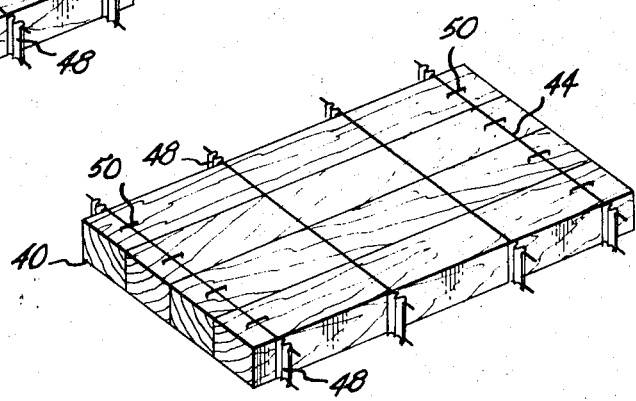
FIG. 4 illustrates, how a tensioned wire board assembly may have the end tensioned wires stapled to the respective narrower wood strips where additional control over the inner narrower wood strips is required to prevent possible buckling with respect to production of boards.

In summary, and first discussing again the novel application of the principles for this new method, which are:

(a) retention of sufficient bonding pressure at a lower pressure than believed possible previously and releasing originally applied lateral forces as lateral forces are maintained by smaller wires or wire-like members, see FIGS. 2, 3 etc.;

(b) maintaining in balance the wood strip assembled by balanced tensioned wires similar to the Skin-Stress Principle employed in hollow core doors, see FIGS. 3, 4, etc.;

(c) the application of a minimum restraining force to prevent buckling where board width-to-thickness ratio exceeds certain limits, see FIGS. 4, 5, etc.;

(d) designing of wire retaining means in such a manner as to prevent the means from slipping around edge corners of certain size boards which would otherwise cause an unbalanced condition in tensioned wires resulting in buckling of wood strip assembly, see FIGS. 3, etc. and 12 through 16.

In summary with respect to the practical aspects of the invention, this invention consists of an improved method for edge gluing of lumber into wider boards, or the manufacture of other glued up lumber products and the apparatus and materials used to fully utilize the inherent advantages of the invention.

The unique and novel application of the principles involved: provides a new method whereby the gluing operation could be accomplished with less costly machinery compared with modern presses; enables use of either hot or cold setting adhesives; enables faster rate of production than any other known method of lumber edge gluing; and allows a wide range of moisture content permissible in wood.

The performance of edge gluing by this new method is not affected by wood stock variables, temperatures, etc., and also the rate of production is not related directly to the board width, number of glue lines, board thickness, etc. Other disadvantages and limitations placed by other production methods are overcome by this new method, offering speed, economy and simplicity.

I claim:

1. A method for producing edge glued and glued up wood panels and boards derived from narrower wood strips and boards, comprising:
   (a) applying adhesive to bond surfaces of narrower wood strips that are to be joined to others;
   (b) crowding the glue treated narrower wood strips into wider board widths of predetermined sizes using antibuckling forces as necessary;
   (c) passing wire-like tension members across the crowded glue treated narrower wood strips at selected locations;
   (d) securing the wire-like tension members in tension across the crowded glue treated narrower wood strips by holding them securely in retaining means;
   (e) curing the glue of the resulting wider board under specified conditions; and
   (f) removing the tensioned wires and their retaining means after sufficient curing of glue.

2. A method for producing edge glued and glued up wood panels and boards derived from narrower wood strips and boards, comprising:
   (a) applying adhesive to bond surfaces of narrower wood strips that are to be joined to others;
   (b) assemblying glue treated narrower wood strips into wider board widths of predetermined sizes;
   (c) applying lateral bonding pressure to wood strip assembly and vertical alignment pressure to wood strip assembly;
   (d) passing wire-like tension members across the crowded glue treated narrower wood strips at selected locations;
   (e) securing the wire-like tension members in tension across the crowded glue treated narrower wood strips by holding them securely in retaining means;
   (f) removing temporary lateral pressure and vertical adjustment pressure, but retaining necessary bonding pressure by wire like members;
   (g) curing the glue of the resulting wider board under specified conditions; and
   (h) removing the tensioned wires and their retaining means after sufficient curing of glue.

3. In the method, as claimed in claim 1, following securing of the wire-like tension members in retaining means, the further step of securing selected wire-like tension members to selected narrower wood strips that are being glued together to form a wider board, thereby eliminating buckling of the wider board.

4. In the method, as claimed in claim 1, following securing of the wire-like tension members in retaining means, the further step of securing selected wire-like tension members to selected narrower wood strips that are being glued together to form a wider board by stitching or stapling over wires thereby eliminating buckling of the wider board.

5. In the method, as claimed in claim 1, following securing of the wire-like tension members in receiving means, the further step of securing together selected narrower wood strips that are being glued together to form a wider board by using a continuous member equipped with wood penetrating portions, thereby eliminating buckling of the wider board.

6. In the method, as claimed in claim 1, following securing of the wire-like tension members in receiving means, the further step of securing together the narrower wood strips that are being glued together to form a wider board by using a simple mechanical holding clamp, thereby eliminating buckling of the wider board.

7. In the method, a claimed in claim 1, following securing of the wire-like tension members in receiving means, the further step of holding together the narrower wood strips that are being glued together to form a wider board by applying a vertical restraining force to prevent buckling.

8. In the method, as claimed in claim 1, following securing of the wire-like tension members in receiving means, the further step of holding together the narrower wood strips that are being glued together to form a wider board by using rollers to prevent buckling.

9. In the method, as claimed in claim 1, following securing of the wire-like tension members in receiving means, the further step of holding together the narrower wood strips that are being glued together to form a wider board by using belts to prevent buckling.

10. In the method as claimed in claim 1, following removal of the tensioned wires and their retaining means, the succeeding step of trimming and finishing the glued together narrower strips to finally form the wider board to meet given size specifications.

11. In the method, as claimed in claim 1, after passing wire-like tension members across the crowded glue treated narrower wood strips at selected location, the step of tightening the wire-like tension members by moving them on diagonals across the wood strips thereby taking up slack in wires and increasing their tension.

References Cited

UNITED STATES PATENTS

| | | | |
|---|---|---|---|
| 794,873 | 7/1905 | Mayhew | 156—304 XR |
| 1,366,172 | 1/1921 | Elmendorf | 156—304 |
| 1,428,765 | 9/1922 | Elmendorf | 156—304 |
| 2,290,761 | 7/1942 | Miller | 156—304 |
| 2,344,488 | 3/1944 | Bowling | 156—304 |
| 2,571,604 | 10/1951 | Payzant | 156—304 XR |
| 2,729,584 | 1/1956 | Foster | 156—304 XR |

BENJAMIN R. PADGETT, Primary Examiner

U.S. Cl. X.R.

156—91, 267, 288, 321